April 14, 1970     R. L. WEBB     3,506,046
MEAT CUBING MACHINE

Filed Oct. 17, 1967     4 Sheets-Sheet 1

Fig_1

INVENTOR.
RODGER L. WEBB
BY Bertha L. MacGregor
ATTORNEY

April 14, 1970 R. L. WEBB 3,506,046
MEAT CUBING MACHINE
Filed Oct. 17, 1967 4 Sheets-Sheet 2

INVENTOR.
RODGER L. WEBB
BY Bertha L. MacGregor
ATTORNEY

April 14, 1970  R. L. WEBB  3,506,046
MEAT CUBING MACHINE
Filed Oct. 17, 1967  4 Sheets-Sheet 3

INVENTOR.
RODGER L. WEBB
BY Bertha L. MacGregor
ATTORNEY

April 14, 1970         R. L. WEBB              3,506,046
                  MEAT CUBING MACHINE
Filed Oct. 17, 1967                        4 Sheets-Sheet 4
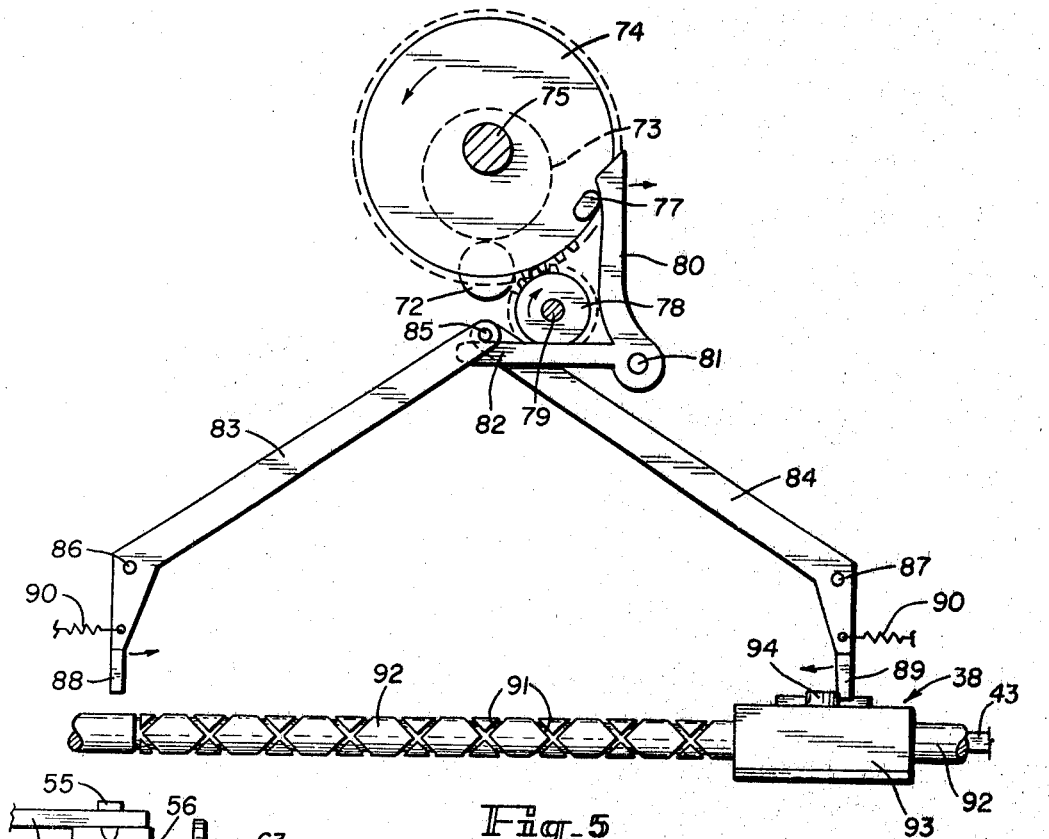
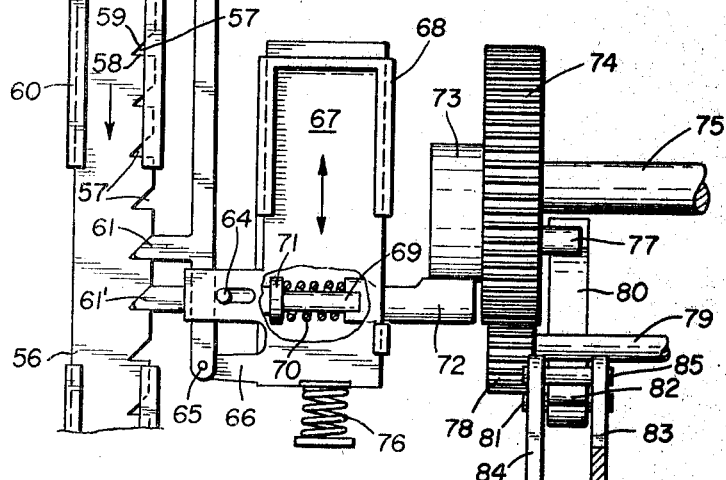
INVENTOR.
RODGER L. WEBB
BY
Bertha L. MacGregor
ATTORNEY United States Patent Office 3,506,046
Patented Apr. 14, 1970

3,506,046
MEAT CUBING MACHINE
Rodger L. Webb, Englewood, Colo.
(5909 S. Clayton St., Littleton, Colo. 80120)
Filed Oct. 17, 1967, Ser. No. 675,916
Int. Cl. B02c *18/04;* B26d *4/02*
U.S. Cl. 146—78                    10 Claims

ABSTRACT OF THE DISCLOSURE

A machine for cubing meat and other material comprising a housing, first and second framed sets of vertically disposed, parallel, transversely spaced apart knife blades having their cutting edges upwardly disposed, the first set above the other, with the blades of one set extending longitudinally at right angles to the blades of the other set and positioned in the housing to support the meat during the cutting. Means for reciprocating the blades in opposite longitudinal directions are operatively detachably connected to each frame. A pressure plate on top of the meat is operatively connected to means intermittently moving said plate. A horizontally disposed double edged knife blade, located beneath one of said framed sets of blades, is operatively connected to said pressure plate and is provided with means for reciprocating the blade longitudinally and with means moving said blade across the housing in a horizontal plane through the meat when the pressure plate has moved downwardly a predetermined distance.

The blades are easily removable from their frames, and the frames are detachable from their reciprocating mechanisms. The frames and blades are compactly arranged in the housing in superposed relationship where the downward movement and cutting of the meat are facilitated by gravity. The meat is supported on the cutting edges of the vertical blades during the cutting operation, and the cubes drop by gravity between the blades into a bin.

---

This invention relates to a cubing machine and more particularly to a machine for cutting meat into cubes of uniform, predetermined size. Obviously the machine may be used for cubing material other than meat, but will be described herein as designed primarily for converting large pieces of meat into cubes of desired dimensions.

The main object of the invention is to provide a compact efficient machine in which the meat is maintained in sanitary condition while it is being cubed. Another object is to provide a machine in which the meat is supported by the cutting edges of the blades which perform the cutting as the meat passes downwardly during the cubing operation under the influence of gravity and applied pressure.

The cutting blades are compactly located in a housing through which the uncut meat passes downwardly to rest on the cutting edges of the blades, the cutting operation being facilitated by pressure applied to the top of the piece and by influence of gravity, as well as by reciprocation of the blades longitudinally in opposite directions.

In the embodiment of the invention shown herein, a first set of vertically extending, parallel, transversely spaced apart cutting blades are removably mounted in a frame. The frame is detachably and operatively connected to means for imparting longitudinal reciprocation in opposite directions to the frame and blades therein. The cutting edges of the blades enter the bottom of the meat piece to be cubed. If one inch cubes are to be produced, the blades will be transversely spaced apart one inch, and the meat piece will be moved downwardly to permit cutting into the meat to a depth which will produce unsevered parallel strips which depend one inch below the lower edges of the blades of the first set of blades.

Beneath the said first set of blades is a double edged blade horizontally disposed to slice across the unsevered strips for the purpose of severing them from the piece at a predetermined depth.

A second set of framed blades is like the first set, but extends in the housing at right angles to the blades of said first set. It is located beneath the first set and the horizontally disposed slicing blade. However, the horizontal slicing blade may be located in a plane beneath the second set of blades which perform the vertical cuttings. This second set of blades, in the embodiment herein shown and described, cuts into the downwardly moving piece to cut across the previously cut and severed strips. The resultant cubes fall by gravity into a bin located in the housing.

The means for imparting reciprocatory movement in opposite directions longitudinally to the blades of the two sets of blades may be independent of each other or operatively connected to reciprocate the sets of cutting blades in successive timed intervals, the reciprocation being approximately one-quarter inch in each direction. The cutting edges may be serrated or plain.

The influence of gravity on the meat piece to be cubed is supplemented by a pressure plate which bears on top of the piece. Mechanism for forcing the plate downwardly is operatively connected to mechanism for moving the horizontally disposed slicing blade through the meat and is timed to move the plate downwardly a predetermined distance each time the slicing blade travels horizontally in one direction.

In the drawings:

FIG. 5 is a rear elevational view of the mechanism which actuates the horizontally disposed double edged knife blade.

FIG. 6 is an elevational side view, as viewed from the right hand side of FIG. 1, showing the mechanism for actuating the presser plate and for operatively connecting the plate to the mechanism which actuates the horizontally disposed double edged knife blade.

Figure 1:
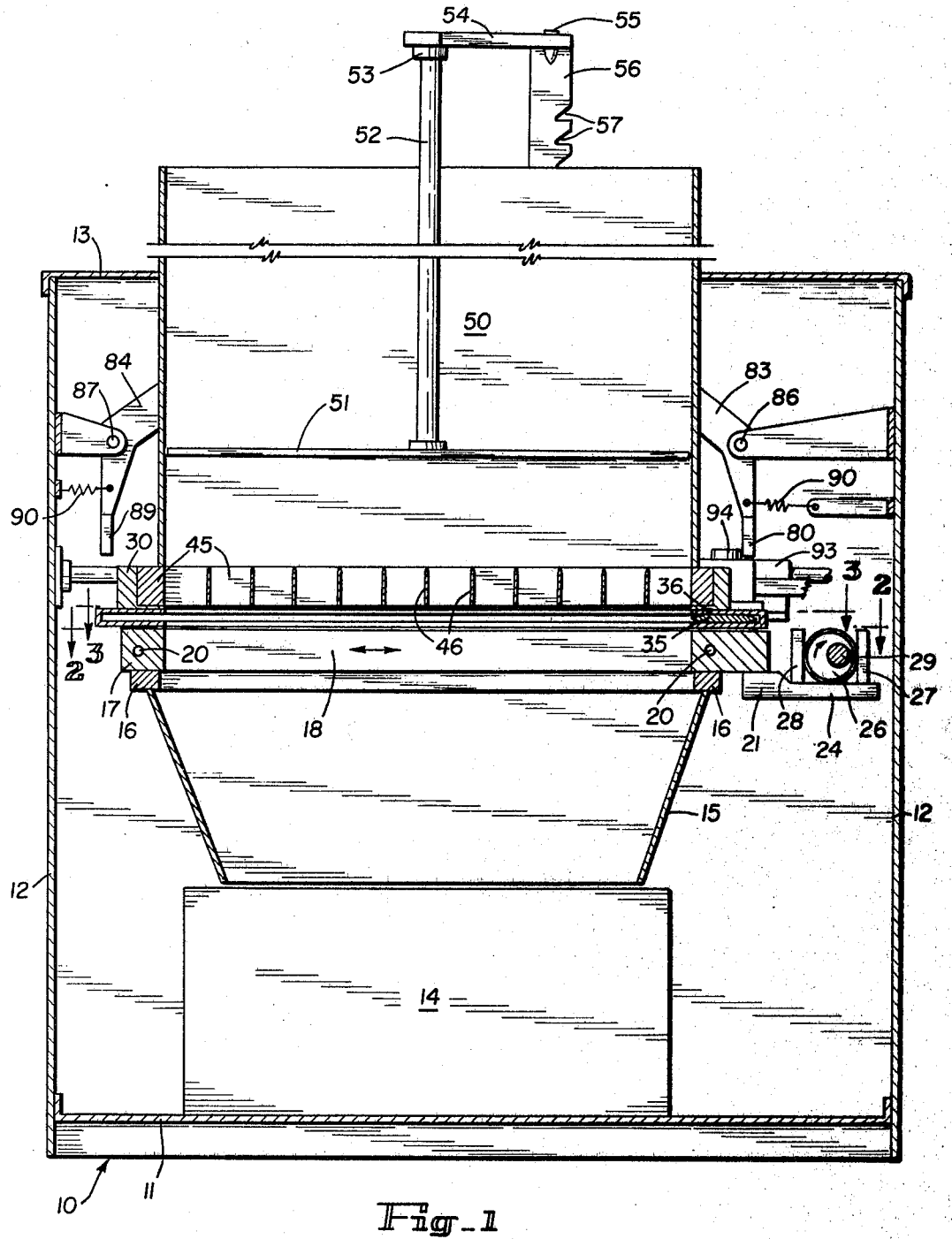
FIG. 1 is a vertical sectional view, partly in front elevation, of a cubing machine embodying my invention.
Figure 2:
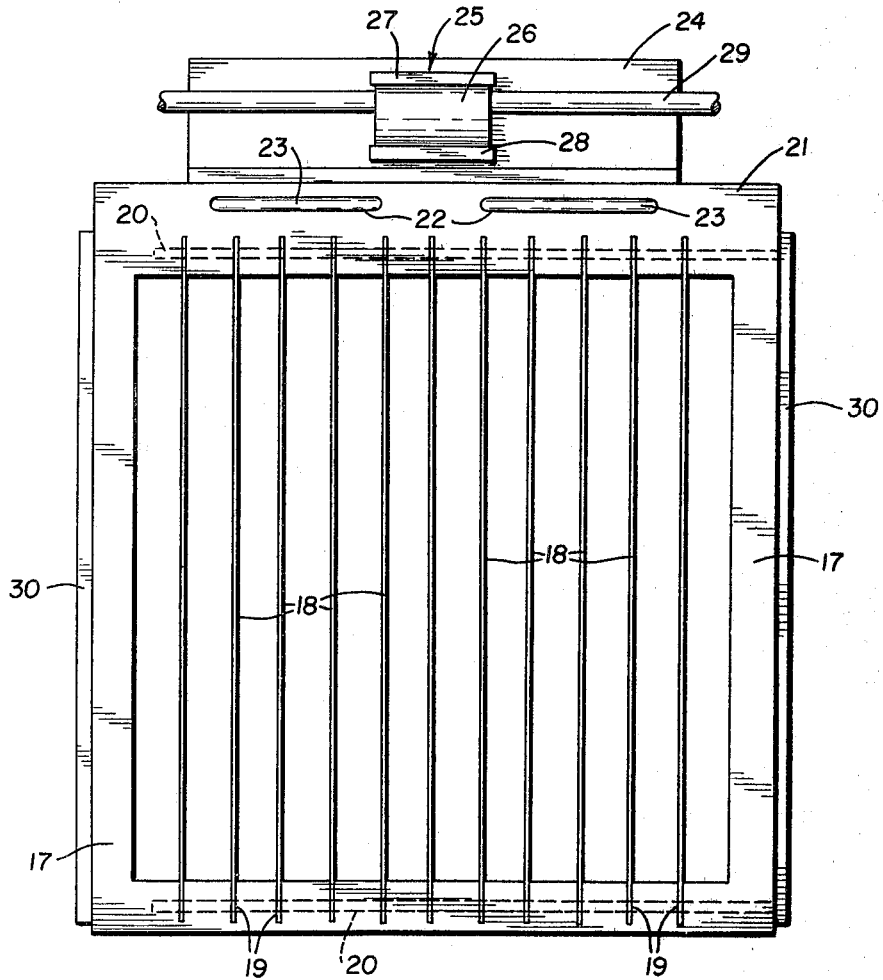
FIG. 2 is a horizontal sectional view in the plane of the line 2—2 of FIG. 1.

As shown in FIG. 1, the housing 10 comprises a bottom wall 11, side walls 12 and top 13, enclosing a bin 14 on the bottom 11 for receiving the cubed meat from a discharge chute 15 provided with a stationary frame 16 which supports the frame 17 of one set of knife blades 18. The frame 17 is rectangular, preferably comprising four side bars integrally formed of stainless steel. The blades 18 are spaced apart transversely as shown in FIG. 2. The blades are vertically disposed, with their ends removably but snugly held in vertical slots 19 formed in opposite end bars of the frame 17 by rods 20 which extend through apertures in the ends of the blades 18 and through the bars of the frame 17. The blades are spaced apart a predetermined equal distance; for example, one inch if meat or other material is to be cut into one inch cubes.

Adjacent one end of the blades 18, the frame 17 is widened as indicated at 21 to provide means for detachably connecting the frame as a whole to mechanism for reciprocating the frame and blades 18 mounted therein. The connecting means comprises a pair of elongated longitudinally aligned slots 22 adapted to receive locking bars 23 extending upwardly from the support 24 on which is mounted reciprocating means 25 consisting of a cam 26, cam abutting upright members or followers 27, 28, and motor driven shaft 29 on which the cam 26 is fixedly mounted. The shaft 29 may be square, or if round the cam is keyed to rotate with the shaft. When the locking bars 23 are engaged in the slots 22, the knife blade frame 17 and blades 18 are given a reciprocatory movement in opposite directions by rotation of the cam 26 bearing alternately against the members 27 and 28. In the present embodiment for cubing meat the reciprocatory movement is about one-quarter inch in each direction. The upper edges of the blades 18 are the cutting edges. Stationary side supports 30 are mounted in the housing 10 at opposite sides of the reciprocated frame 17.

In this embodiment, a horizontally disposed, double edged single blade 35 (FIGS. 1 and 3) is slidably mounted adjacent opposite ends in a frame 36 stationarily located to permit the blade 35 to move in a horizontal plane slightly above the upwardly directed cutting edges of the blades 18 in the frame 17. One end of the blade 35 extends outwardly beyond the frame 36 and is connected by rivets 37 or other suitable means to reciprocating mechanism 38 comprising a support 39, cam 40, cam abutting followers 41, 42, and rotated shaft 43. The shaft 43 is square and is driven by a motor (not shown) or other suitable means. The cam 40 rotates with the shaft to impart reciprocatory movement in opposite directions to the blade 35. The reciprocating means 38 as a whole is slidable on the square shaft 43.

The mechanism for moving the blade 35 in a horizontal plane across the open frame 36 in opposite directions as indicated by the arrows in FIG. 3 will be described hereinafter in connection with the means for bearing on the material to be cubed.

Another rectangular frame 45, similar to the frame 17, has mounted therein a plurality of vertically disposed knife blades 46, similar to the blades 18 heretofore described. The blades 46 extend longitudinally at right angles to and across the blades 18. The frame 45 and blades 46 are located above the horizontally disposed knife blade 35 in the embodiment of the invention shown herein, but the blade 35 may be located in a horizontal plane beneath the lower edges of the blades 18. The upwardly directed edges of the blades 46 are the cutting edges. The blades 46, like the blades 18, are equi-distantly spaced apart transversely of the blades, the spacing depending on the size of the cubes to be produced.

The uppermost set of blades 46 will be referred to hereinafter and in the claims as the first set and the blades 18 will be referred to as the second set of blades because the meat to be cubed first encounters the blades 46 of the first set and thereafter the blades 18 of the second set.

Figure 4:
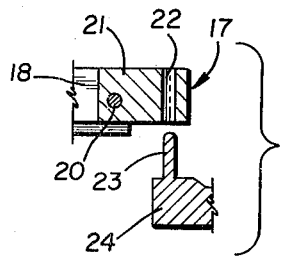
FIG. 4 is a vertical sectional view of the locking mechanism which connects a set of framed knife blades to the reciprocating mechanism, showing the parts detached from each other.

The blades 46 are mounted in the frame 45 by means similar to those heretofore described in connection with the blades 18 in frame 17, such as the rods 20 in slots 19 in the frame 17. Likewise, the frame 45 is reciprocated by reciprocating mechanism such as shown at 25 in FIG. 2. The frame 45 also is connected to reciprocating mechanism (not shown) by means similar to the parts indicated at 22, 23, 24, shown in FIG. 4, and arranged relatively to the frame 45 in the manner shown in FIG. 2 in conection with frame 17 and support 24, but not visible in FIG. 1 because the reciprocating mechanism for frame 45 and blades 46 is located rearwardly of the parts shown in FIG. 1.

A meat receiving hopper 50 is mounted in the housing 10, extending above and below the top 13 of the housing. The depth of the hopper 50 may vary, depending on the size of the meat pieces or other material to be cubed. The side walls of the hopper 50 extend downwardly to the plane of the cutting edges of the blades 46 and upper surface of the frame so that meat in the hopper rests on the cutting edges of the blades 46.

A horizontal presser plate 51 of suitable dimensions to fit within the hopper 50 and to bear on the meat is rigidly connected to a vertical rod 52 pivotally connected at 53 to a horizontal arm 54. The latter is pivotally connected at 55 to a vertical bar 56 provided with a plurality of equi-distantly vertically spaced apart notches 57 which have horizontal lower surfaces 58 and upwardly outwardly inclined surfaces 59 as shown in FIGS. 1 and 6. The bar 56 is slidably supported in a channel guide 60.

The notches 57 are adapted to receive a bolt 61 which has an end surface complemental to the notch surfaces 58, 59 and is connected to a vertical handle 62 which has a grip portion 63 and extends downwardly through a bracket 64 with its lower end pivotally connected at 65 to an arm 66 which is part of a slide 67 mounted in a channel guide 68. The slide 67 houses a horizontal rod 69 which is part of the bolt 61'. A spring 70 surrounds rod 69 and bears against a stop shoulder 71 at one end and against the inner end of depresser member 72 depressed by cam 73 on one face of idler gear 74 mounted to rotate on shaft 75.

The bracket 64 is slotted to permit movement of the bolt 61' and rod 69 by manual movement of the handle 62 in order to withdraw bolts 61 and 61' from notches 57, thereby compressing spring 70 and permitting movement or withdrawal of vertical bar 56, arm 54 and vertical rod 52 with attached presser plate 51.

Depression of the depresser member 72 moves slide 67, bracket 64, bolts 61, 61', and handle 62 downwardly a distance equal to the distance between centers of two notches 57, carrying with it the vertical bar 56, arm 54, vertical rod 52 and depresser plate 51, thereby moving the meat down into position for the next cutting by the blades 18.

A spring 76 yieldingly supports the slide member 67. The gear 74 carries a tripper dog 77 eccentrically mounted on the gear. The dog 77 engages the arm 80 of a bell crank lever pivotally mounted at 81, to cause the other arm 82 of the lever to lift the actuating device consisting of actuating arms 83, 84, pivotally connected together at 85. The arm 83 is pivotally connected to housing 10 by a pivot pin 86, and the arm 84 is pivotally connected to the housing 10 by a pivot pin 87. The actuating ends of the arms 83, 84, are indicated at 88, 89, respectively. The ends 88, 89 swing inwardly toward each other when the lever arm 82 lifts the arms 83, 84 at their pivotal connection 85. Springs 90 connect each arm 83, 84, to the housing, and urge the arms to normal position when the lever arm 80 has been released by the tripper dog 77.

As shown in FIG. 5, the ends 88, 89, of the actuating lever arms 83, 84, alternately engage a switch lever 94 on the mounting member 93 slidable on the lead screw 92. The switch lever 94 actuates a pin (not shown) in the mounting member 93 to engage the threads 91 of the screw 92. Rotation of the screw 92 causes the mounting member 93 to travel from one end of the screw 92 to the opposite end by reason of the engagement between the pin on switch lever 94 and the threads 91 of the screw 92. The reciprocating means 38 travels with the mounting member 93, as shown in FIG. 3.

The rotation of the cam 73 is timed so that the tripper dog 77 engages the arm 80 at the end of each stroke in one direction of the member 93, thus causing the reciprocating mechanism 38 to which the blade 35 is attached to travel across the frame 36 in one direction and then in the opposite direction.

The operation of the machine is as follows: Meat or other material to be cut into cubes or other portions is placed in the hopper 50, beneath the plate 51, and is supported on the upper cutting edges of the blades 46. The pressure plate 51 is lowered to bear on the meat by lowering the vertical sliding bar 56. This is done by disengaging the bolts 61, 61', from the notches 57 in bar 56 by moving the handle 62 to the right as viewed in FIG. 6. When the plate 51 has been lowered, the bolts are again engaged with the notched bar 56. Then the meat is cut by the reciprocated blades 46 while it is moved downwardly a predetermined distance by gravity and pressure exerted by the plate 51 when the plate and the bar 56 are actuated by the cam 73 bearing on depressing means 72 by rotation of shaft 79 and gear 78. The downward movement is predetermined to produce cutting into the bottom of the meat a sufficient distance so that unsevered strips depend a desired distance below the lower edges of the blades 46.

Figure 3:
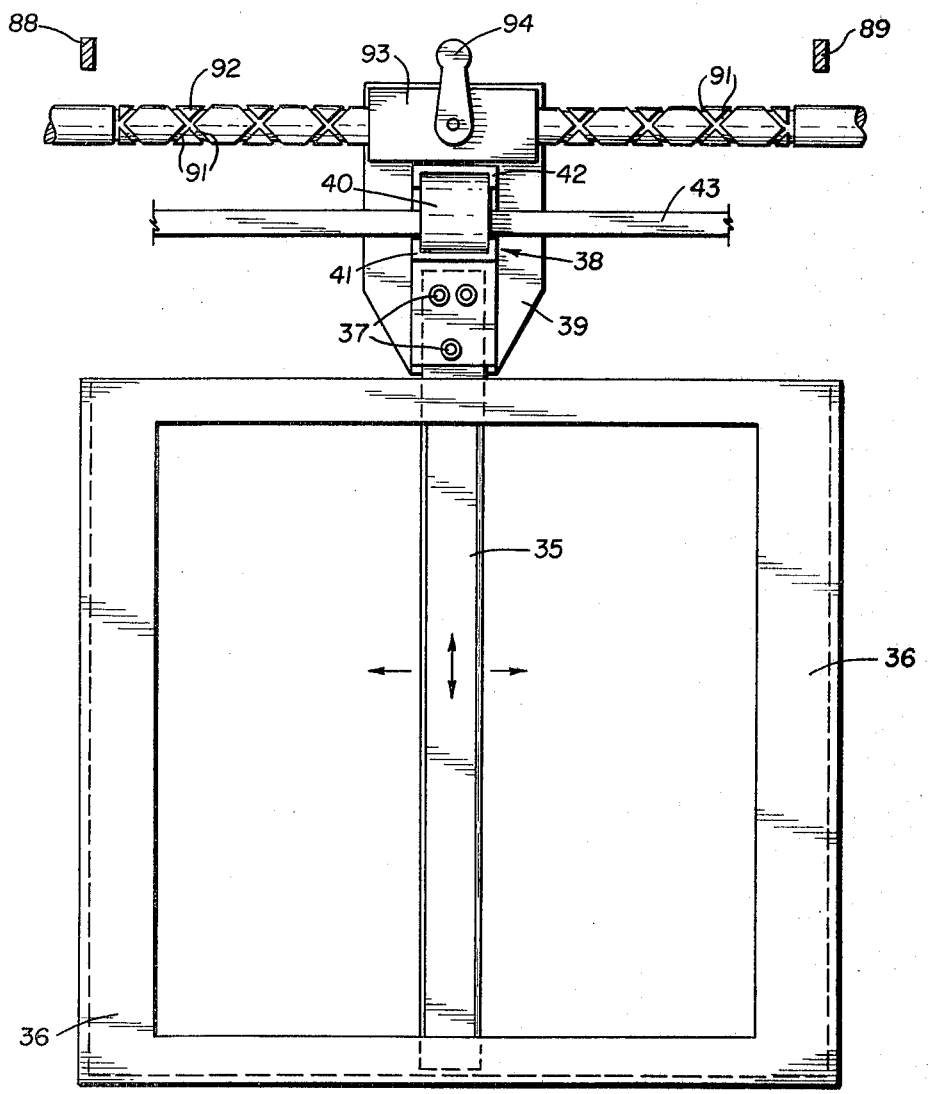
FIG. 3 is a horizontal sectional view in the plane of the line 3—3 of FIG. 1.

Next, the horizontally disposed reciprocated blade 35 is moved by the mechanism shown in FIG. 3 across the unsevered strips to sever them from the rest of the meat.

Then the severed strips encounter and are supported on the cutting edges of reciprocated blades 18 which cut across the strips vertically to produce cubes or portions which fall by gravity into the chute 15 to the bin 14.

This cycle of movements is repeated as required to cube the meat or other material. The horizontal blade 35 moves across the frame 36 in one direction during one cycle, and in the opposite direction during the following cycle. At the end of the operation, the blades and their frames may be removed for cleansing, and the pressure plate 51 and attached mechanism may be removed from the machine by disengaging the bolts 60, 61' from the vertical slide bar 57.

The spacing of the blades 18 and 46 from each other may be varied to produce cubes or other portions of any desired size.

Changes may be made in details of construction, in the mechanism for reciprocating the blades and in the means for moving the horizontal blade across its frame, as well as in the form of the parts, without departing from the scope of the invention as defined by the appended claims.

I claim:
1. A cubing machine comprising
   (a) a housing,
   (b) a hopper in the upper part of the housing,
   (c) a cubed material bin located below the hopper,
   (d) first and second sets of vertically disposed parallel transversely spaced apart longitudinally reciprocated blades having their cutting edges directed upwardly for supporting and cutting the material to be cubed, the second set of blades being located beneath and extending at right angles to the blades of the first set,
   (e) a horizontally disposed double edged longitudinally reciprocated blade located adjacent the lower edges of one of said first and second sets of blades, and
   (f) means moving said horizontal blade across the housing in one direction during each cycle of operations of the first and second sets of blades and moving said horizontal blade in the opposite direction during the following cycle of operations of said first and second sets of blades,
       all of said blades being located in a vertically restricted space between the hopper and bin, and reciprocable in different horizontal planes, allowing the cubed material to fall by gravity into the bin

2. The cubing machine defined by claim 1, in which the blades of each of said first and second sets of blades are removably mounted in a frame.

3. The cubing machine defined by claim 1, in which the blades of each of said first and second sets of blades and said horizontal blade are mounted in frames which carry means mounted thereon for reciprocating said blades longitudinally.

4. The cubing machine defined by claim 1, which includes a pressure plate in the hopper bearing on the material to be cubed, and operative mechanism between the plate and the horizontally disposed blade for moving said blade across the housing when the plate has been moved downwardly a predetermined distance.

5. A cubing machine comprising
   (a) an open top housing,
   (b) a hopper in the upper part of the housing,
   (c) a cubed material bin located below the hopper,
   (d) first and second sets of vertically disposed parallel transversely spaced apart blades having their cutting edges directed upwardly for supporting and cutting the material to be cubed, the second set of blades being located beneath and extending at right angles to the blades of the first set,
   (e) a horizontally disposed double edged blade located adjacent the lower edges of one of said first and second sets of blades,
   (f) frames in which said horizontally disposed blade and each of the first and second sets of blades are mounted,
   (g) reciprocating mechanism detachably mounted on each of said frames for reciprocating the blade and sets of blades, and
   (h) means moving said horizontal blade across the housing, said horizontal blade and said first and second sets of vertically disposed blades being reciprocable in different horizontal planes, allowing the cubed material to fall by gravity into the bin.

6. The cubing machine defined by claim 5, which includes a pressure plate in the hopper bearing on the material to be cubed, and means detachably operatively connecting the pressure plate and the horizontal blade moving means.

7. The cubing machine defined by claim 5, which includes a pressure plate in the hopper bearing on the material to be cubed, means detachably operatively connecting the pressure plate and the horizontal blade moving means to move said blade when the pressure plate has been moved downwardly a predetermined distance, and manually actuated means for disconnecting the pressure plate and permitting its removal from the blade moving means and from the hopper.

8. The cubing machine defined by claim 5, in which the means for moving the horizontal blade across the housing is actuated to move the blade in one direction during each cycle of operations of the first and second sets of blades and in the opposite direction during the following cycle of operations of said first and second sets of blades.

9. The cubing machine defined by claim 5, in which all of the blades are located in a vertically restricted space between the hopper and the bin.

10. The cubing machine defined by claim 5, in which the frames in which the first and second sets of blades are mounted have oppositely located end bars provided with vertical slots for removably holding the blade ends.

References Cited

UNITED STATES PATENTS

| 682,722 | 9/1901 | Lindenberg et al. | 146—78 |
| 1,354,263 | 9/1920 | Miller et al. | |
| 1,430,049 | 9/1922 | Applegate | 146—78 |
| 1,865,986 | 7/1932 | White | 146—78 |

W. GRAYDON ABERCROMBIE, Primary Examiner

U.S. Cl. X.R.

146—151